(12) United States Patent
Kim et al.

(10) Patent No.: US 11,350,282 B2
(45) Date of Patent: May 31, 2022

(54) METHOD AND APPARATUS FOR DETECTING NULL-CIPHERING CHANNELS

(71) Applicant: KOREA INTERNET & SECURITY AGENCY, Jeollanam-do (KR)

(72) Inventors: Do Won Kim, Jeollanam-do (KR); Seong Min Park, Jeollanam-do (KR); Bo Min Choi, Jeollanam-do (KR); Young Kwon Park, Jeollanam-do (KR); Jin Hyun Cho, Jeollanam-do (KR); Hyung Jin Cho, Jeollanam-do (KR); Sung Moon Kwon, Jeollanam-do (KR)

(73) Assignee: KOREA INTERNET & SECURITY AGENCY, Jeollanam-do (KR)

( * ) Notice: Subject to any disclaimer, the term of this patent is extended or adjusted under 35 U.S.C. 154(b) by 0 days.

(21) Appl. No.: 17/332,851

(22) Filed: May 27, 2021

(65) Prior Publication Data

US 2022/0046423 A1 Feb. 10, 2022

(30) Foreign Application Priority Data

Aug. 7, 2020 (KR) ........................ 10-2020-0099443

(51) Int. Cl.
*H04W 12/122* (2021.01)
*H04W 76/30* (2018.01)
*H04W 12/06* (2021.01)
*H04W 48/02* (2009.01)
(Continued)

(52) U.S. Cl.
CPC ....... *H04W 12/122* (2021.01); *H04L 63/1466* (2013.01); *H04L 63/205* (2013.01);
(Continued)

(58) Field of Classification Search
CPC ... H04W 12/122; H04W 12/06; H04W 48/02; H04W 76/30; H04W 12/04;
(Continued)

(56) References Cited

U.S. PATENT DOCUMENTS

| 8,744,474 | B1* | 6/2014 | Singh | .................... H04W 68/02 |
| | | | | 455/453 |
| 2018/0083914 | A1* | 3/2018 | Yamaura | ................. H04L 67/12 |

(Continued)

FOREIGN PATENT DOCUMENTS

KR 10-1579757 B1 2/2010
KR 10-2011-0119785 A 11/2011
(Continued)

OTHER PUBLICATIONS

Paul Shepherd, Discover 5G Core Network Functions Compared to 4G LTE, Award Solutions Sep. 10, 2018, p. 3, 4 (Year: 2018).*

*Primary Examiner* — Nam T Huynh
(74) *Attorney, Agent, or Firm* — Studebaker & Brackett PC

(57) ABSTRACT

Provided is a method for detecting abnormal traffic. The method comprises collecting non-access stratum (NAS) traffic between a user equipment (UE) and a mobility management node, identifying a ciphering algorithm supported by the UE from a network access request message transmitted from the UE to the mobility management node, and identifying the UE as a first type of terminal at risk based on a determination that the UE only supports a null ciphering algorithm.

16 Claims, 11 Drawing Sheets

(51) Int. Cl.
*H04L 9/40* (2022.01)
*H04W 12/106* (2021.01)

(52) U.S. Cl.
CPC ......... *H04W 12/06* (2013.01); *H04W 12/106* (2021.01); *H04W 48/02* (2013.01); *H04W 76/30* (2018.02)

(58) Field of Classification Search
CPC ... H04W 12/041; H04W 12/08; H04W 12/37; H04L 63/205; H04L 2463/061; H04L 63/1466; H04L 63/20
See application file for complete search history.

(56) References Cited

U.S. PATENT DOCUMENTS

| | | | |
|---|---|---|---|
| 2018/0317218 A1* | 11/2018 | Li | H04W 68/02 |
| 2018/0324594 A1* | 11/2018 | Chen | H04L 63/20 |
| 2018/0332554 A1* | 11/2018 | Kawasaki | H04W 4/70 |
| 2019/0182717 A1* | 6/2019 | Ye | H04W 36/165 |
| 2020/0012745 A1 | 1/2020 | Bain | |
| 2020/0068391 A1* | 2/2020 | Liu | H04L 63/162 |
| 2020/0336305 A1* | 10/2020 | Li | H04W 12/06 |

FOREIGN PATENT DOCUMENTS

| | | | | |
|---|---|---|---|---|
| KR | 10-2015-0035301 A | 4/2015 | | |
| KR | 10-2015-0073375 A | 7/2015 | | |
| KR | 10-1669165 B1 | 10/2016 | | |
| WO | WO-2019089543 A1 * | 5/2019 | ........... | H04L 63/205 |
| WO | WO-2020218843 A1 * | 10/2020 | ........... | H04W 12/033 |

\* cited by examiner

UE network capability

1... .... = EEA0: Supported
.1.. .... = 128-EEA1: Supported
..1. .... = 128-EEA2: Supported
...0 .... = 128-EEA3: Not supported
.... 0... = EEA4: Not supported
.... .0.. = EEA5: Not supported
.... ..0. = EEA6: Not supported
.... ...0 = EEA7: Not supported
0... .... = EIA0: Not supported
.1.. .... = 128-EIA1: Supported
..1. .... = 128-EIA2: Supported
...0 .... = 128_EIA3 Not supported
.... 0... = EIA4: Not supported
.... .0.. = EIA5: Not supported
.... ..0. = EIA6: Not supported
.... ...0 = EIA7: Not supported

FIG. 5A

| UE network capability |

```
1... ....  = EEA0:     Supported
.0.. ....  = 128-EEA1: Not supported
..0. ....  = 128-EEA2: Not supported
...0 ....  = 128-EEA3: Not supported
.... 0...  = EEA4:     Not supported
.... .0..  = EEA5:     Not supported
.... ..0.  = EEA6:     Not supported
.... ...0  = EEA7:     Not supported
1... ....  = EIA0:     Supported
.0.. ....  = 128-EIA1: Not supported
..1. ....  = 128-EIA2: Supported
...0 ....  = 128_EIA3  Not supported
.... 0...  = EIA4:     Not supported
.... .0..  = EIA5:     Not supported
.... ..0.  = EIA6:     Not supported
.... ...0  = EIA7:     Not supported
```

FIG. 5B

| ITEM | FIELD NAME | DESCRIPTION | TYPE(DB) | EXAMPLE |
|---|---|---|---|---|
| Summary | SummaryCreateTime | xDR OUTPUT TIME | TIME | YYYYMMDDHHMMSS |
| | IMSI | IMSI(TERMINAL IDENTIFICATION INFORMATION) | VARCHAR2 | 15881555555 |
| | MSISDN | TERMINAL IDENTIFICATION MSISDN(PHONE NUMBER) | VARCHAR2 | 010-XXXX-XXXX |
| User | User_IP_version | TERMINAL ip version | NUMBER | 0 = ip v4, 1 = ip v6 |
| | User_IPv4 | TERMINAL IP(ipv4) | NUMBER | 178463157 |
| | User_IPv6 | TERMINAL IP(ipv6) | NUMBER | 2001:2db:23b:6ab9:0:0:1fd:a4 |
| | TAI List | LIST OF BASE STATION TO WHICH UE CAN ACCESS<br>* IDENTIFY LOCATION OF ATTACKER (INFECTING) TERMINAL | VARCHAR2 | TAI list = {(MCC: 450, MNC:999, TAC: 2048), (MCC: 450, MNC:999, TAC: 2058) ...} |
| NAS msg Info. | AttachRequest_Time | ATTACH REQUEST MESSAGE OCCURRENCE TIME | TIME | YYYYMMDDHHMMSS |
| | AttachReject_Cause | ATTACH REQUEST REJECT MESSAGE | NUMBER | |
| | AttachRequest_Type | ATTACH REQUEST TYPE | NUMBER | 1: EPS attach<br>2: combined EPS/IMSI attach<br>6: EPS emergency attach |
| | SecurityMode Command_Time | Security Mode Command TIME | TIME | YYYYMMDDHHMMSS |
| | SecurityMode Reject_Cause | Security Mode Command TIME | NUMBER | |
| | ue_network_capability | EEA, EIA SETTING HEX VALUE | VARCHAR2 | Hex String by Network byte order |
| | selected_eea | SELECTED EEA (CIPHERING) ALGORITHM<br>* Selected EEA Mode by MME | NUMBER | |

FIG. 8

| ITEM | FIELD NAME | DESCRIPTION | TYPE(DB) | EXAMPLE |
|---|---|---|---|---|
| THREAT DETERMINATION | Detect_Time | DETECTION TIME | TIME | YYYYMMDDHHMMSS |
| | Detect_msg | DETECTION MESSAGE | VARCHAR2 | CIPHERING DISABLEMENT ATTEMPT TERMINAL, NON-STANDARD TERMINAL, CIPHERING DISABLEMENT CHANNEL |
| | MSISDN | IDENTIFY ATTACKER TERMINAL MSISDN | VARCHAR2 | 010-XXXX-XXXX |
| | IMSI | IDENTIFY ATTACKER TERMINAL IMSI | VARCHAR2 | 15081555555 |
| | User_IP_version | User ip version | VARCHAR2 | 0 = ip v4, 1 = ip v6 |
| | User_IPv4 | IP OF ATTACKER TERMINAL(ipv4) | NUMBER | 178463157 |
| | User_IPv6 | IP OF ATTACKER TERMINAL(ipv6) | NUMBER | 2001:2d8:23b:6ab9:0:0:11fd:a4 |
| Attacker Info | TAI List | LIST OF BASE STATION TO WHICH UE CAN ACCESS * IDENTIFY LOCATION OF ATTACKER (INFECTING) TERMINAL | VARCHAR2 | TAI list = {{MCC: 450, MNC:999, TAC: 2048}, {MCC: 450, MNC:999, TAC: 2058}, ...} |

FIG. 9

METHOD AND APPARATUS FOR DETECTING NULL-CIPHERING CHANNELS

This application claims the benefit of Korean Patent Application No. 10-2020-0099443, filed on Aug. 7, 2020, in the Korean Intellectual Property Office, the disclosure of which is incorporated herein by reference in its entirety.

BACKGROUND

Field

The present disclosure relates to a method and apparatus for detecting a wireless channel established in an unencrypted manner in LTE (Long Term Evolution) and 5G networks. More specifically, it relates to a method and apparatus for detecting an unintended null-ciphering channel established between a user terminal and a core network by a MITM (man-in-the-middle) method.

Description of the Related Art

The 5G mobile communication standard considers both the NSA (Non-Standalone) structure and the SA (Standalone) structure as a structure for the core network for the evolution from 4G to 5G. The SA uses the 5G standard's own structure for both the control plane in charge of mobility management of the terminal and the user plane in charge of data traffic of the user. On the other hand, the NSA is a structure that is expected to be used in the initial commercial network of 5G mobile communication, and the operation of the control plane uses the 4G LTE network, and the user plane is a structure that uses a 5G network, which is faster than 4G LTE. In other words, in the 5G NSA, operation methods of the control plane according to the 4G LTE standard may be used.

In the 4G LTE standard, LTE authentication is a process of checking whether a user is allowed to access from the network's point of view and whether the network is correct from the user's point of view based on accessing the network. Non-access stratum (NAS) and access stratum (AS) security setting is a setting process for safely transmitting user data transmitted through the LTE wireless link in the NAS and AS sections. In the NAS security setting, the integrity and ciphering method for NAS signaling between a user equipment (UE) and a mobility management entity (MME) may be determined. In the AS security setting, the integrity and ciphering method for the RRC signaling between the user equipment (UE) and the base station (eNodeB, gNodeB) and user data traffic may be determined.

Looking at the NAS security setting process in more detail, first, based on the UE transmitting a network access request (Attach Request) message to the network, the value of the 'UE Network Capability' field is set in this message. A value set in the 'UE Network Capability' field indicates the type of ciphering and integrity protection algorithm supported by the UE. As for the ciphering algorithm, among EEA0 (null ciphering; meaning no ciphering), 128-EEA1 (SNOW 3G algorithm), 128-EEA2 (AES algorithm), and 128-EEA3 (ZUC algorithm), an algorithm supported by the UE is set. As for the integrity protection algorithm, among EIA0 (null integrity protection; means that integrity is not checked), 128-EIA1 (SNOW 3G algorithm), 128-EIA2 (AES algorithm), 128-EIA3 (ZUC algorithm), an algorithm supported by the UE is set.

The MME selects a ciphering and integrity algorithm to be applied to the NAS message with the UE based on the value set in the 'UE Network Capability' field in the Attach Request message. And MME transmits a NAS Security Mode Command message including 'Replayed UE Security Capability' (a field set by copying the value of the 'UE Network Capability' field set in the UE's Attach Request message as it is), 'NAS Ciphering Algorithm' (NAS ciphering algorithm selected by MME), 'NAS Integrity Protection Algorithm' (NAS integrity algorithm selected by the MME), and a NAS Security Mode Command message including key information, etc. to the UE. At this time, the NAS Security Mode Command message is integrity protected but is not ciphered.

Based on the NAS Security Mode Command message received from the MME, the UE recognizes the ciphering/integrity algorithm selected by the MME, derives the key, and transmits a NAS Security Mode Complete message to the MME based on there being no problem as a result of going through various verification processes. At this time, the NAS Security Mode Complete message is an integrity protected and ciphered message.

The MME verifies the integrity of the NAS Security Mode Complete message and decrypts it, and terminates the NAS security setting process, and transmits an Attach Accept message to the UE. Subsequently, the AS security setting process between the UE and the base station proceeds.

In the above-described LTE NAS security setting process, it should be noted that based on the UE setting the 'UE Network Capability' field of the network access request message, the ciphering algorithm it supports can be set as a 'null ciphering algorithm.' That is, it is noted that the UE can set not to cipher NAS signaling messages exchanged with the MME. One of the reasons why null ciphering and null integrity protection may be supported in the LTE standard is that there are situations in which a call should be made without a USIM containing a valid ciphering key of a subscriber, such as an emergency call. In other general situations, the integrity protection algorithm should be set to any one of the ciphering algorithms other than EIA0 (null integrity protection), whereas the ciphering algorithm may be set to EEA0 (null ciphering). That is, communication between the UE and the network is possible through a null-ciphering channel. Due to this point, 4G LTE and 5G NSA networks have a security problem in that a MITM (man-in-the-middle) attack is possible. 5G SA networks also have similar issues discussed above although terms indicating each entity and signaling messages may be slightly different.

The man-in-the-middle attack is an attack technique that manipulates network communication to eavesdrop or manipulate communication contents. In the man-in-the-middle attack, a man in the middle invades between two subjects connecting communication, and the two think that each connects to the other, but in reality, the two may be connected to the man in the middle, and the man in the middle intercepts and manipulates information transmitted from one side, and then passes it to the other side.

FIG. 1 is a diagram for describing a man-in-the-middle attack that can be detected according to some embodiments of the present disclosure. Referring to FIG. 1, an attacker's equipment 15 performing a man-in-the-middle attack intercepts communication between the victim UE 10 and the base station 21, manipulates the messages between the victim UE 10 and the network, and induces to establish an encrypted wireless channel between the victim UE 10 and the network.

The attacker equipment 15 may be an equipment having both a component that functions as a UE and a component that functions as a base station. Through this, the attacker equipment 15 disguises itself as a base station (e/gNodeB) against the victim UE 10 and disguises itself as a UE against the base station 21. The attacker equipment 15 lures the UE around the attacker equipment 15 to access itself by using the feature of the UE accessing the base station with the strongest signal.

In LTE, since the Attach Request that the UE 10 requests to access the network is not protected by security, the attacker equipment 15 can intercept it, and the ciphering algorithm set by the UE 10 in the Attach Request may be overwritten with a null ciphering algorithm. Based on the network finally accepting the null ciphering algorithm, the attacker equipment 15 can communicate with the network without a valid key while disguising it as the victim UE 10. Briefly looking at the procedure, first, the victim UE 10, which recognizes the attacker equipment 15 as a base station, transmits an Attach Request to the attacker equipment 15. The Attach Request message includes the IMSI (International Mobile Subscriber Identity) of the victim UE 10 and the aforementioned UE Network Capability information. The attacker equipment 15 performs an operation of changing the EEA (ciphering algorithm) setting value of the UE Network Capability in the Attach Request message to EEA0 (null ciphering algorithm; meaning no ciphering). Further, the attacker equipment 15 transmits the manipulated Attach Request message to the network through the base station 21.

The MME 31 receiving the Attach Request message exchanges messages (Authentication Request, Authentication Response) for performing a mutual authentication process between the UE and the network with the home subscriber server 35. However, the attacker equipment 15 relays the messages between the victim UE 10 and the MME 31 so that normal authentication is performed. Subsequently, the MME 31 sets not to cipher NAS signaling messages with the victim UE 10 due to the fact that the UE Network Capability field value is set to EEA0 in the aforementioned Attach Request message. The MME 31 transmits a NAS Security Mode Command message including information indicating that the null ciphering setting has been selected to the victim UE 10 through the attacker equipment 15.

Based on the victim UE 10 verifies and accepts the NAS Security Mode Command message, the victim UE 10 transmits a NAS Security Mode Complete message to the MME 31 through the attacker equipment 15, and the NAS security setting procedure is terminated by the MME replying to the victim UE 10 with an Attach Accept message.

Through the above-described process, although the victim UE 10 did not actually select the null ciphering algorithm, an unencrypted wireless channel is established between the network by the message manipulation of the attacker's equipment 15, which is mistaken for the base station and accessed by itself, and then NAS/RRC signaling and information in the user plane is communicated without ciphering. Meanwhile, the attacker equipment 15 may intercept and leak information transmitted and received by the victim UE 10 without ciphering, or use data communication without charging by stealing the IMSI of the victim UE 10 through the IP address assigned to the victim UE 10. 5G SA networks also have similar issues discussed above although terms indicating each entity and signaling messages may be slightly different.

SUMMARY

The technical problem to be solved through some embodiments of the present disclosure is to provide a method and apparatus for detecting an unintended null ciphering channel established between a user equipment and a core network by a MITM (man-in-the-middle) attack in LTE and 5G mobile communication networks.

Another technical problem to be solved through some embodiments of the present disclosure is to provide a method and apparatus for protecting the billing records of normal subscribers due to network traffic through an unintended null ciphering channel established between a user equipment and a core network in LTE and 5G mobile communication networks.

Another technical problem to be solved through some embodiments of the present disclosure is to provide a method and apparatus for identifying a terminal attempting null-ciphering in LTE and 5G mobile communication networks.

Another technical problem to be solved through some embodiments of the present disclosure is to provide a method and apparatus for identifying a non-standard terminal that does not correctly verify a UE Network Capability field setting value in LTE and 5G mobile communication networks.

Another technical problem to be solved through some embodiments of the present disclosure is to provide a method and apparatus for limiting access of a non-ciphering attempt terminal or non-standard terminal.

Another technical problem to be solved through some embodiments of the present disclosure is to provide a method and apparatus for recognizing the physical location of a null-ciphering attempt terminal or non-standard terminal.

According to an embodiment, a method for detecting abnormal traffic may include collecting non-access stratum (NAS) traffic between a user equipment (UE) and a mobility management node, identifying a ciphering algorithm supported by the UE from a network access request message transmitted from the UE to the mobility management node; and identifying the UE as a first type of terminal at risk based on a determination that the UE only supports a null ciphering algorithm.

According to an embodiment, wherein identifying a ciphering algorithm supported by the UE may include identifying a 'UE Network Capability' field value of the network access request message.

According to an embodiment, the method for detecting abnormal traffic may further include transmitting, to a core network, a message to limit access to the UE identified as the first type of terminal at risk.

According to an embodiment, wherein transmitting a message to limit access to the UE may include identifying an subscriber identity information included in the network access request message from the UE and transmitting a message including the identified subscriber identity information to an authentication server of the core network.

According to an embodiment, the method for detecting abnormal traffic may further include determining whether a network access request message has been transmitted to the UE from the mobility management node; and identifying a channel formed between the UE and the mobility management node as a channel at risk based on a determination that the network access request message has been transmitted.

According to an embodiment, the method for detecting abnormal traffic may further include transmitting a message for disconnecting the channel at risk to a core network.

According to an embodiment, wherein transmitting a message for disconnecting the channel at risk to a core network may include transmitting a message to retrieve an IP address allocated to the UE to a P-GW or user plane function (UPF) of the core network.

According to an embodiment, the method for detecting abnormal traffic may further include identifying an subscriber identity information included in the network access request message from the UE; obtaining a plurality of network access request messages having the identified subscriber identity information; and determining whether 'UE Network Capability' field values included in each of the plurality of network access request messages may be identical.

According to an embodiment, the method for detecting abnormal traffic may further include determining whether a 'NAS Security Mode Complete' message has been transmitted from the UE to the mobility management node in response to determining that the 'UE Network Capability' field values in each of the plurality of network access request messages may not be identical; and identifying the UE as a second type of terminal at risk based on a determination that the 'NAS Security Mode Complete' message has been transmitted.

According to an embodiment, the method for detecting abnormal traffic may further include transmitting, to a core network, a message to limit access from the UE identified as the second type of terminal at risk.

According to an embodiment, wherein transmitting a message to limit access from the UE may include transmitting a message including the identified subscriber identity information to an authentication server of the core network.

According to an embodiment, the method for detecting abnormal traffic may further include excluding billing entries corresponding to traffic generated by data transmission and reception of the UE from billing records associated with the identified subscriber identity information based on a determination that the 'UE Network Capability' field values in each of the plurality of network access request messages may not be identical.

According to an embodiment, the method for detecting abnormal traffic may further include identifying physical location information of the UE.

According to an embodiment, wherein identifying physical location information of the UE may include identifying a tracking area identifier (TAI) of a base station that transmitted the network access request message of the UE to the a mobility management node.

According to another embodiment, an apparatus for detecting abnormal traffic may include a network interface for collecting non-access stratum (NAS) traffic between a user equipment (UE) and a mobility management node, a memory for loading a computer program for analyzing collected traffic, and a processor for executing the loaded computer program, wherein the computer program may include an instruction for identifying a ciphering algorithm supported by the UE from a network access request message transmitted from the UE to the mobility management node, and an instruction for identifying the UE as a first type of terminal at risk based on a determination that the UE only supports a null ciphering algorithm.

According to another embodiment, the computer program may further include an instruction for determining whether an access accept message has been transmitted to the UE from the mobility management node, and an instruction for identifying a channel formed between the UE and the mobility management node as a channel at risk based on a determination that the access accept message has been transmitted.

According to an embodiment, the computer program may further include an instruction for identifying an subscriber identity information included in the network access request message from the UE, an instruction for obtaining a plurality of network access request messages having the identified subscriber identity information; an instruction for determining whether 'UE Network Capability' field values included in each of the plurality of network access request messages may be identical; an instruction for determining whether a 'NAS Security Mode Complete' message has been transmitted from the UE to the mobility management node based on a determination that the 'UE Network Capability' field values in each of the plurality of network access request messages may not be identical; and an instruction for identifying the UE as a second type of terminal at risk based on a determination that the 'NAS Security Mode Complete' message has been transmitted.

According to another embodiment, a mobile communication system may include a core network including a mobility management node, and an abnormal traffic detection system, wherein the abnormal traffic detection system is configured to collect traffic between the mobility management node and the UE, identify a ciphering algorithm supported by the UE from a network access request message transmitted from the UE to the mobility management node, identify the UE as a first type of risk terminal based on a determination that the UE only supports a null ciphering algorithm, determine whether an access accept message has been transmitted to the UE from the mobility management node, and identify a channel formed between the UE and the mobility management node as a channel at risk based on a determination that the access accept has been transmitted.

According to another embodiment, the abnormal traffic detection system may be further configured to determine whether an access accept message has been transmitted to the UE from the mobility management node, and identify a channel formed between the UE and the mobility management node as a channel at risk based on a determination that the access accept message has been transmitted.

According to another embodiment, the abnormal traffic detection system may be further configured to identify a subscriber identity information included in the network access request message from the UE, obtain a plurality of network access request messages having the identified subscriber identity information, determine whether 'UE Network Capability' field values included in each of the plurality of network access request messages are identical, determine whether a 'NAS Security Mode Complete' message has been transmitted from the UE to the mobility management node based on a determination that the 'UE Network Capability' field values in each of the plurality of network access request messages are not identical, and identify the UE as a second type of terminal at risk based on a determination that the 'NAS Security Mode Complete' message has been transmitted.

BRIEF DESCRIPTION OF THE DRAWINGS

FIGS. 5a and 5b may be reference diagrams for describing a 'UE Network Capability' field included in a network access request message referenced in some embodiments of the present disclosure.

FIG. 8 is a diagram illustrating an exemplary format of traffic data provided as an input to an abnormal traffic detection system in some embodiments of the present disclosure.

FIG. 9 is a diagram illustrating an exemplary format of detection result data output from an abnormal traffic detection system in some embodiments of the present disclosure.

DETAILED DESCRIPTION

Figure 1:
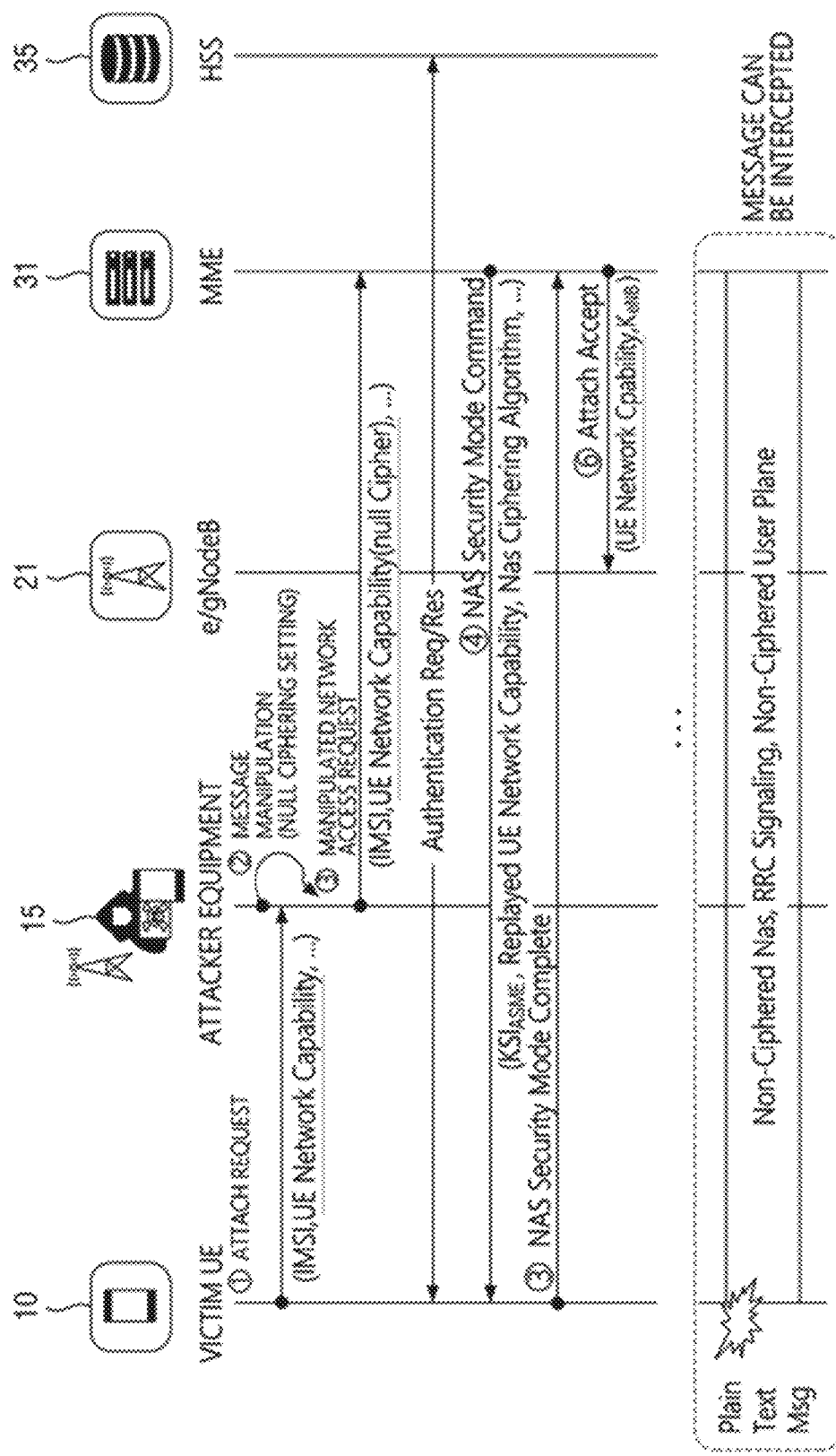
FIG. 1 is a diagram illustrating a man-in-the-middle attack that can be detected according to some embodiments of the present disclosure.

Hereinafter, embodiments of the present disclosure will be described with reference to the attached drawings. Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments may be provided so that this disclosure will be thorough and complete and will fully convey the concept of the disclosure to those skilled in the art, and the present disclosure will be defined by the appended claims.

In adding reference numerals to the components of each drawing, it should be noted that the same reference numerals may be assigned to the same components as much as possible even though they may be shown in different drawings. In addition, in describing the present disclosure, based on it being determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries may not be ideally or excessively interpreted unless they are specifically defined clearly. The terminology used herein may be for the purpose of describing embodiments and may not be intended to be limiting of the disclosure. In this specification, the singular also includes the plural unless specifically stated otherwise in the phrase.

In addition, in describing the component of this disclosure, terms, such as first, second, A, B, (a), (b), can be used. These terms may be for distinguishing the components from other components, and the nature or order of the components may not be limited by the terms. Based on a component being described as being "connected," "coupled" or "contacted" to another component, that component may be directly connected to or contacted with that other component, but it should be understood that another component also may be "connected," "coupled" or "contacted" between each component.

Hereinafter, some embodiments of the present disclosure will be described in detail with reference to the accompanying drawings.

First, a configuration and operation of a 5G mobile communication system, to which an abnormal traffic detection system according to an embodiment of the present disclosure can be applied, will be described with reference to FIG. 2. In the embodiment illustrated in FIG. 2, the 5G mobile communication system may operate in a NSA (non-standalone) manner. However, it should be noted that an abnormal traffic detection system according to another embodiment of the present disclosure may be applied to a 5G mobile system operating in SA (standalone) manner as well.

Figure 2:
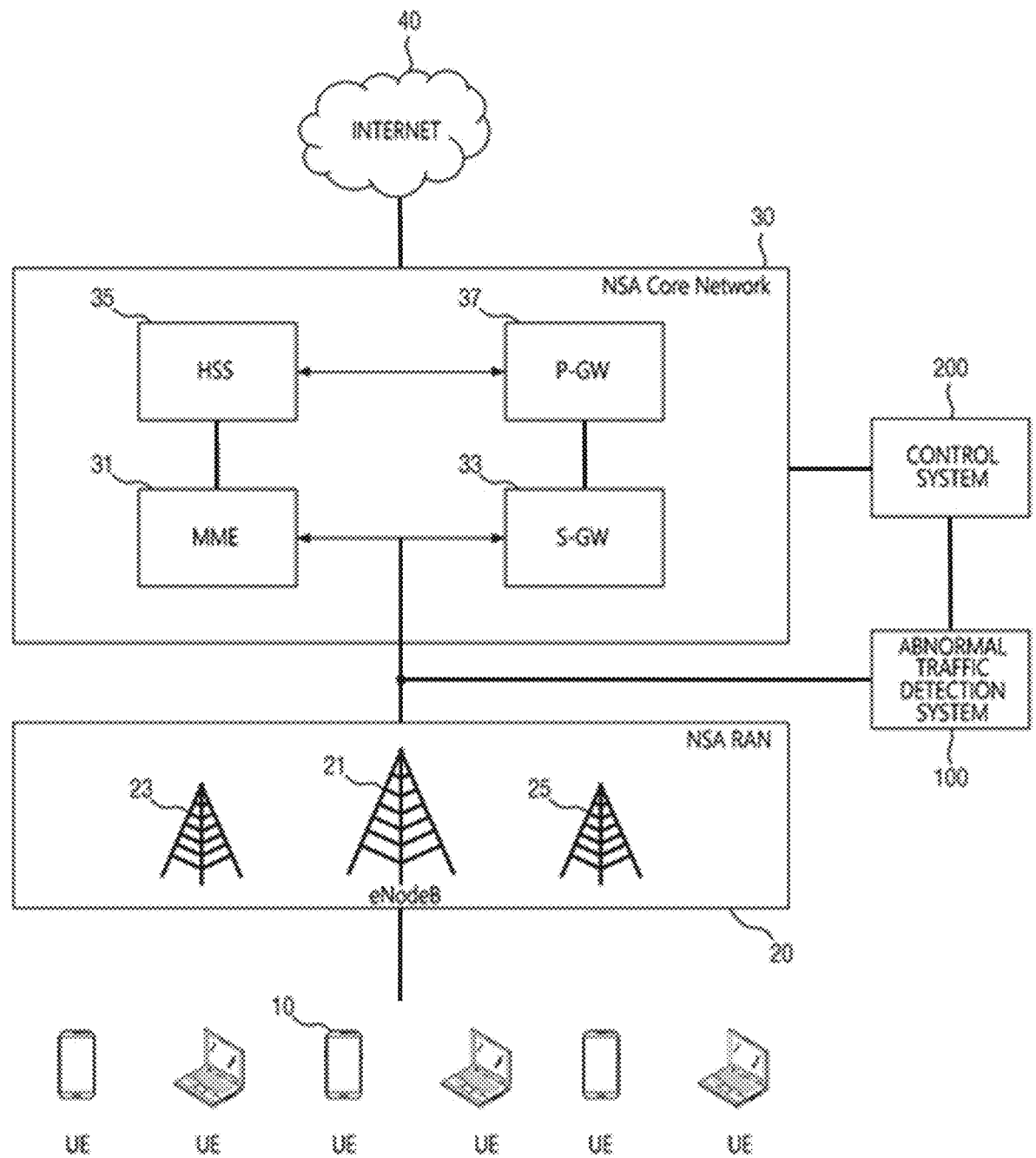
FIG. 2 is a block diagram showing an exemplary configuration of an abnormal traffic detection system according to an embodiment of the present disclosure applied to a 5G mobile communication network.

Referring to FIG. 2, UEs 10 may be connected to the NSA Core Network 30 through a NSA Radio Access Network (RAN) 20 composed of one or more base stations (e/gNodeB) 21, 23 and 25, and may be connected to the Packet Data Network, that is, the Internet 40 through the NSA Core Network 30. In another embodiment that may be utilized for 5G SA networks, the UEs 10 may be connected with the SA Core network (not shown).

The UE 10 shown in FIG. 2 may be a user terminal. The UE 10 may be a smart phone, a USB modem, a computer incorporating a mobile communication module based on hardware and/or software, or the like. The UE 10 may be equipped with or built-in a USIM card including subscriber identify information such as IMSI (International Mobile Subscriber Identify), SUPI (Subscription Permanent Identifier) or SUCI (Subscription Concealed Identifier) for subscriber identification and authentication.

The NSA RAN 20 may be a wireless access network created through base stations such as eNodeB 21 and gNodeB. The UE 10 may be wirelessly connected to the NSA Core Network 30 through base stations constituting the NSA RAN 20.

The NSA Core Network 30 includes MME 31, HSS 35, S-GW 33, P-GW 37, and the like.

The MME 31 and HSS 35 may mainly process signals of the control plane.

The Mobility Management Entity (MME) 31 may receive key information for authenticating the UE 10 from the HSS 35 and perform authentication for the UE 10. At this time, the MME 31 may authenticate the UE 10 according to the EPS-AKA authentication protocol. Further, the MME 31 may manage the EPS bearer for the UE 10, and manages the connection state and the active state of the UE 10.

The HSS (Home Subscriber Server) 35 may manage key information for authentication and a subscriber profile for each UE 10. The key information and subscriber profile for authentication may be transmitted to the MME 31 based on the UE 10 accessing the network.

The S-GW 33 and P-GW 37 may mainly handle data traffic of the user plane.

The S-GW (Serving Gateway) 33 may route and deliver user packets between the base stations and the P-GW 37, and serve as an anchoring based on the UE 10 performing handover between eNodeBs or GNodeBs.

P-GW (Packet Data Network Gateway) 37 may be located between the S-GW 33 and the packet data network 40, and serves as a path for transmitting packets between the UE 10 and the PDN (packet data network) 40, billing according to data usage, and a function of allocating an IP address to the UE 10. For example, the packet may be filtered in units of the UE 10 in order to forward the packet received from the UE 10 to the external PDN or transmit the packet received from the external PDN to the UE 10. The P-GW 37 may collect the amount of transmitted/received data, and deliver the collected data amount to the billing server (not shown) for charging. Further, the P-GW 37 may provide a function of limiting data or controlling a data rate. The P-GW 37 may play an anchoring role based on a handover occurring while the S-GW 33 may be changed.

Referring to FIG. 2, the abnormal traffic detection system 100 according to an embodiment of the present disclosure collects and processes NAS traffic between the NSA RAN 20 and the NSA Core Network 30 to detect abnormal traffic. According to another embodiment that may be utilized for 5G SA networks, the abnormal traffic detection system 100 may collect and process NAS traffic between a SA RAN (not shown) and a SA Core Network (not shown) to detect abnormal traffic. Further, the abnormal traffic detection system 100 may provide the abnormal traffic detection result to the control system 200 and allows the control system 200 to take appropriate measures. For a detailed operation of the abnormal traffic detection system 100, a description will be made later with reference to FIGS. 3 to 9.

Hereinafter, a method of detecting abnormal traffic according to another embodiment of the present disclosure will be described with reference to FIG. 3. In the following descriptions, an exemplary method for detecting abnormal traffic occurring in a 5G NSA network may be described for illustration purpose, but it should be understood that the present disclosure may not be limited thereto, and that abnormal traffic occurring in a 5G SA network may be detected.

Figure 3:
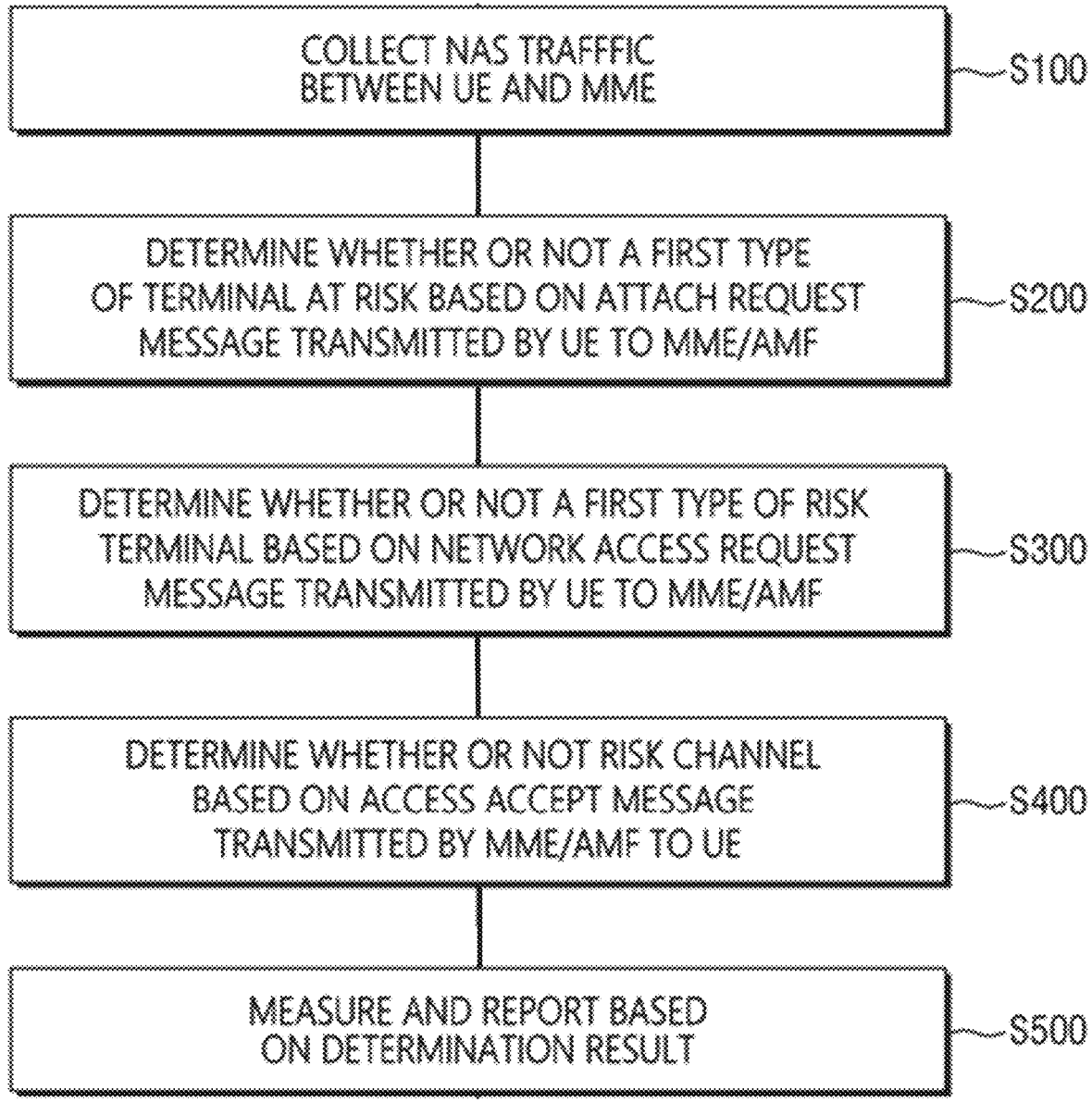
FIG. 3 is a flowchart of a method for detecting abnormal traffic according to another embodiment of the present disclosure.

FIG. 3 is a flowchart of a method for detecting abnormal traffic according to an exemplary embodiment. However, this may be an embodiment for achieving the object of the present disclosure, and some steps may be added or deleted.

Each step of the abnormal traffic detection method illustrated in FIG. 3 may be performed by, for example, a computing device such as the abnormal traffic detection system 100. In other words, each step of the abnormal traffic detection method may be implemented with one or more instructions executed by a processor of the computing device. All the steps included in the abnormal traffic detection method may be executed by one physical computing device, but the first steps of the method may be performed by a first computing device, and the second steps of the method may be performed by a second computing device. Hereinafter, description will be continued on the assumption that each step of the abnormal traffic detection method may be performed by the abnormal traffic detection system 100. However, for convenience of explanation, the description of the operation subject of each step included in the abnormal traffic detection method may be omitted.

In understanding each operation of the method for detecting abnormal traffic according to the present embodiment, the contents described with reference to FIGS. 1 and 2 may be referred to. Further, technical ideas reflected in each operation of the abnormal traffic detection method according to the present embodiment may also be reflected in the configuration and operation of the 5G mobile communication system described with reference to FIG. 2.

Referring to FIG. 3, the abnormal traffic detection method according to this embodiment may include the step of collecting NAS traffic between the UE and the mobility management node such as MME and AMF (Access and Mobility Management Function; not shown) (S100), the step of determining whether or not a first type of terminal at risk (hereinafter, "a first type of risk terminal") based on the network access request message (such as Attach Request or Registration Request) transmitted by the UE to the mobility management node (hereinafter, referred to as "MME") (S200), the step of determining whether or not a second type of terminal at risk (hereinafter, "a second type of risk terminal") based on the NAS Security Mode Complete message transmitted by the UE to the MME (S300), the step of determining whether or not a channel at risk (hereinafter, "a risk channel") based on the access accept message (such as Attach Accept or Registration Accept) transmitted by the MME to the UE (S400), and the step of performing measures based on the determination result and reporting it (S500).

In step S100, NAS traffic information transmitted and received between the UE and the MME may be collected and processed into an appropriate format. The collected NAS traffic information may be provided, for example, to the abnormal traffic detection system 100 shown in FIG. 2 and used to detect abnormal traffic. In step S100, NAS signaling traffic transmitted and received between the eNodeB/gNodeB 21 and the MME 31 may be collected, and may be processed into a format including information of an appropriate field for detection of abnormal traffic.

FIG. 8 is an exemplary diagram illustrating an exemplary format, in which NAS traffic information collected in some embodiments of the present disclosure may be processed. Data processed in the format shown in FIG. 8 may be provided as input to the abnormal traffic detection system 100 described with reference to FIG. 2.

Referring to FIG. 8, NAS traffic information may include information about a user equipment (UE) and information about a NAS message exchanged between the user equipment (UE) and a network. The information on the user equipment (UE) may include subscriber identifier information (such as IMSI, SUCI or SUPI) (hereinafter referred to as "IMSI"), MSISDN (e.g., a phone number), an IP version of the user equipment, an IP address, and a list of base stations to which the user equipment can access (TAI List). The information on NAS messages exchanged between the user equipment (UE) and the network may include the time based on the network access request (such as Attach Request or Registration Request) occurring, information on the network access permission (such as Attach Accept or Registration Accept) or reject (such as Attach Reject or Registration Reject), network access request type, the time based on the Security Mode Command message being sent by the MME to the UE, information on the Security Mode completion or rejection by the UE to the MME, information on the ciphering algorithm (such as EEA or NEA) (hereinafter, referred to as "EEA") and integrity protection algorithm (such as EIA or NIA) (hereinafter, referred to as "EIA") supported by the UE (UE Network Capability), and information on the ciphering algorithm selected by the network.

It will be described again with reference to FIG. 3.

In step S200, it may be determined whether or not a first type of risk terminal based on the network access request message transmitted by the UE to the MME. Step S200 will be described in more detail with reference to FIG. 4.

Figure 4:
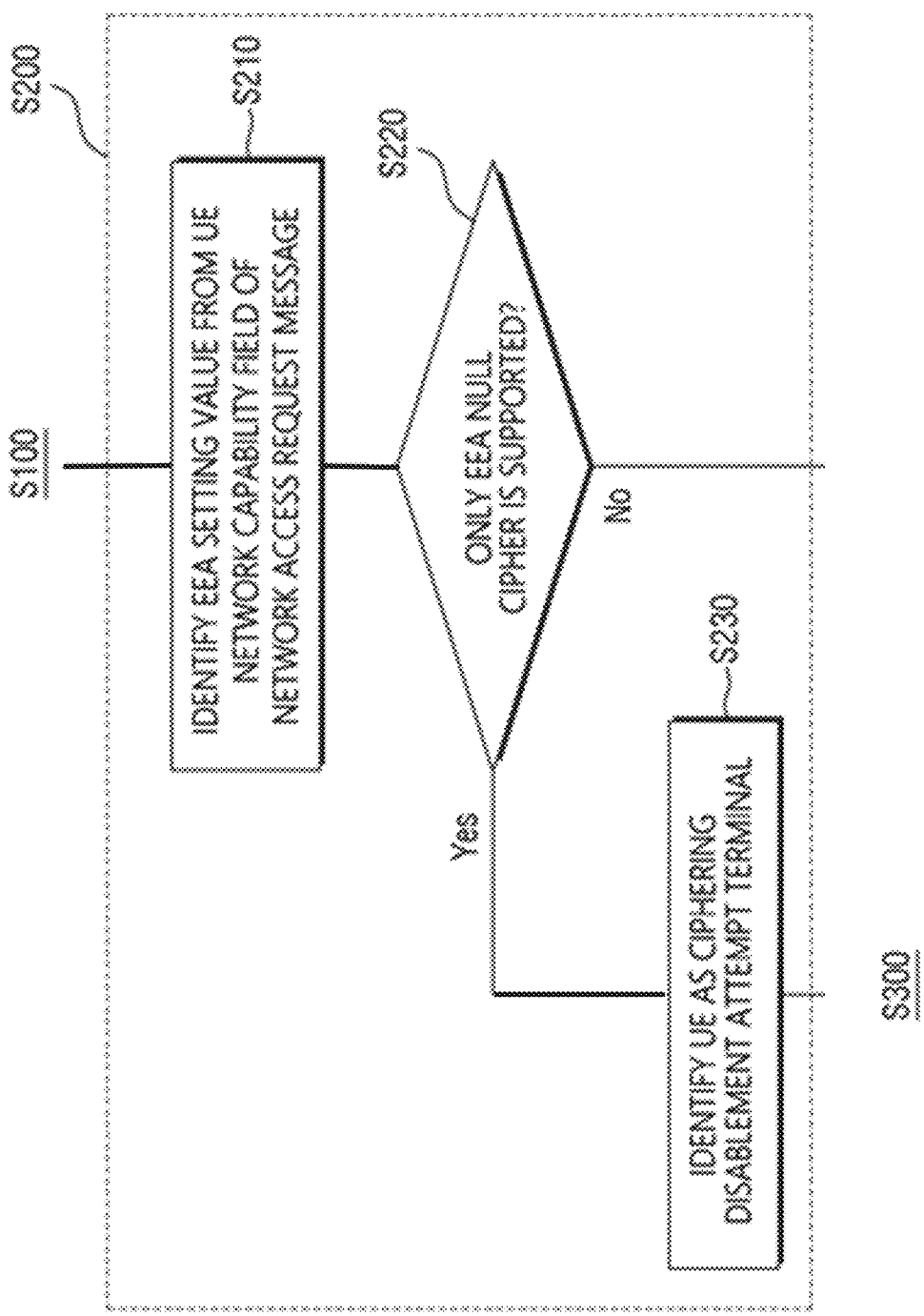
FIG. 4 is a diagram for describing in more detail the step of determining whether or not a first type of risk terminal based on a network access request message among the steps of the method for detecting abnormal traffic described with reference to FIG. 3.

Referring to FIG. 4, in step S210, the EEA set by the UE may be identified from the UE Network Capability field value included in the network access request message transmitted from the UE to the MME. In some embodiments, the ciphering algorithm supported by the UE may be obtained from processed NAS traffic information having a format as shown in FIG. 8.

In step S220, it may be determined whether the UE supports EEA0, that is, a null ciphering algorithm, based on the EEA setting value identified in step S210.

FIGS. 5a and 5b are exemplary diagrams showing exemplary setting values of a 'UE Network Capability' field included the network access request message. In the network access request message, among 8 bits indicating the EEA set by the UE in UE Network Capability, the first bit may indicate whether null ciphering algorithm (EEA0 or NEA0) is supported, the second bit may indicate whether EEA1 (e.g., SNOW 3G algorithm) is supported, the third bit may indicate whether EEA2 (e.g., AES algorithm) may be supported, and the fourth bit may indicate whether EEA3 (e.g., ZUC algorithm) may be supported.

The exemplary setting value of the 'UE Network Capability' field shown in FIG. 5a may indicate that the UE supports EEA0, EEA1, and EEA2 ciphering algorithms. Meanwhile, the exemplary setting value of the 'UE Network Capability' field shown in FIG. 5b may indicate that the UE supports EEA0 (null ciphering), but does not support EEA1, EEA2, and EEA3.

In step S220 of FIG. 4, it may be determined whether the UE supports EEA0 based on the EEA setting value of the 'UE Network Capability' field as described above.

As illustrated in FIG. 5a, a UE that transmits a network access request message by setting a UE Network Capability field to support ciphering algorithms other than null ciphering (e.g., EEA0 and NEA0) may be considered as a normal terminal. In this case, the abnormal traffic detection method may be terminated or may proceed to the analysis process for NAS traffic of another UE.

On the other hand, as in the example shown in FIG. 5b, in the case of a UE that transmits a network access request message by setting the UE Network Capability field to support null ciphering (e.g., EEA0 and NEA0), it may be identified as a terminal attempting to disable ciphering in step S230. In other words, it may be identified as a terminal attempting null ciphering communication with the network, and an appropriate measure may be taken in step S500 to be described later.

It will be described again with reference to FIG. 3.

In step S300, determination of the UE identified as the terminal attempting to disable ciphering in step S200 continues. In step S300, it may be determined whether or not a second type of risk terminal based on the NAS Security Mode Complete message transmitted by the UE to the MME. Further, in step S400, it may be determined whether or not a risk channel based on the access accept message transmitted by the MME to the UE. Steps S300 and S400 will be described in more detail with reference to FIG. 6.

Figure 6:
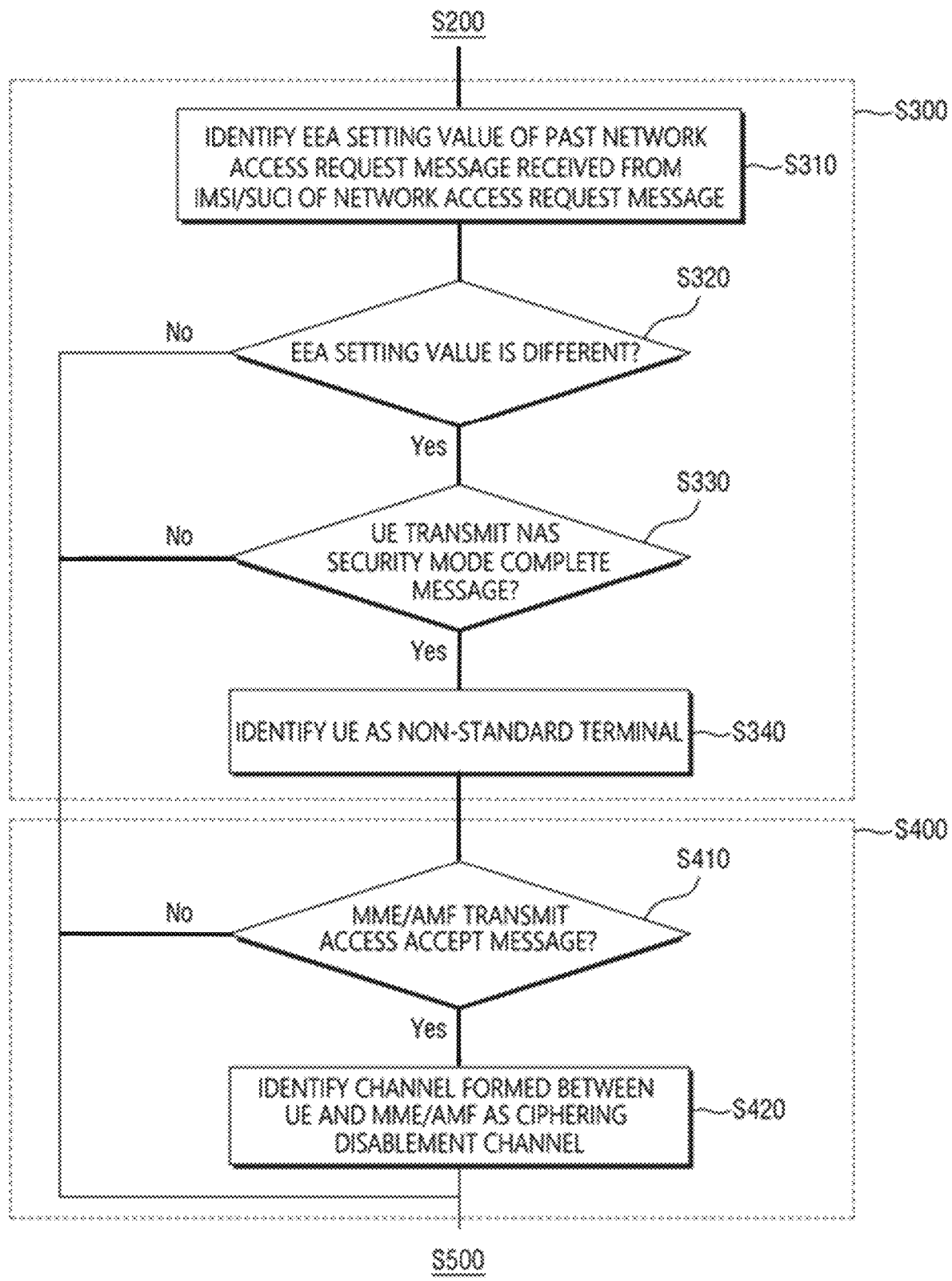
FIG. 6 is a diagram for describing in more detail the steps of determining whether or not a second type of risk terminal based on a NAS Security Mode Complete message and determining whether or not a risk channel based on an access accept message among the steps of the method for detecting abnormal traffic described with reference to FIG. 3.

Steps S310 to S340 shown in FIG. 6 may be more subdivided step S300 of the flowchart shown in FIG. 3, and steps S410 to S420 may be more subdivided step S400 of the flowchart shown in FIG. 3.

First, in step S310, the IMSI of the UE may be identified from the network access request message transmitted by the UE to the MME. In addition, a UE Network Capability field value included in the network access request message transmitted from a UE having a corresponding IMSI in the past may be identified from the past NAS traffic data having the identified IMSI.

In step S320, the UE Network Capability field value described in the network access request message of the UE currently being analyzed and the UE Network Capability field value included in the network access request message transmitted from the UE having the same IMSI in the past may be compared. Based on the two values match, the process proceeds to step S500.

In step S320, based on the two values being different, different UE Network Capability field values may be set from the same UE, so that a network access request has occurred. This implies a possibility that the attacker equipment 15 performing a man-in-the-middle attack intercepted the traffic between the UE and the MME and manipulated the setting value of the UE Network Capability field. In other words, the traffic may be abnormal traffic or the UE may be an abnormal UE. An analysis process to be described later may be additionally performed.

In step S330, it may be determined whether the UE, which received the NAS Security Mode Command message from the MME, has transmitted the NAS Security Mode Complete message or has rejected the NAS Security Mode.

As described above, the MME may select a ciphering algorithm to be applied to the NAS message with the UE based on the value set in the 'UE Network Capability' field in the network access request message. Further, the MME transmits a NAS Security Mode Command message including the 'Replayed UE Security Capability' field, which may be set by copying the 'UE Network Capability' field value set in the network access request message of the UE as it is, and the 'NAS Ciphering Algorithm' field, which indicates the NAS ciphering algorithm selected by the MME, to the UE.

The UE receiving the NAS Security Mode Command message should check whether the 'UE Network Capability' field value in the network access request message sent by itself and the 'Replayed UE Security Capability' field value in the NAS Security Mode Command message sent by the MME match each other. The fact that the two values may be different from each other implies the possibility that the attacker equipment 15 intercepted the traffic between the UE and the MME and manipulated the setting value of the UE Network Capability field. In this case, the UE may reject the NAS Security Mode setting process in response to the NAS Security Mode Command. In other words, the UE may not send a NAS Security Mode Complete message.

Based on the UE transmitting the NAS Security Mode Complete message to the MME even though the 'UE Network Capability' field value in the network access request message and the 'Replayed UE Security Capability' field value in the NAS Security Mode Command message do not match each other, there may be a possibility that the UE is a UE disguised by the attacker equipment 15 performing a man-in-the-middle attack. In this case, in step S340, the UE may be identified as a non-standard terminal or an abnormal terminal.

Based on the UE not transmitting the NAS Security Mode Complete message to the MME and appropriately rejecting the NAS Security Mode setting process, the process proceeds to step S500.

Subsequently, in steps S410 to S420, an additional determination may be performed on the UE identified as a non-standard terminal in step S340.

In step S410, it may be determined whether the MME has transmitted an access accept message to the UE identified as a non-standard terminal.

Based on the access accept message being transmitted, the channel established between the UE and the MME in step S420 may be identified as an abnormal channel, such as, for example, a ciphering disablement channel.

The UE may set the UE Network Capability field to support EEA0 (null ciphering) and transmits a network access request message (i.e., a terminal attempting to disable ciphering), and despite the difference from the field setting value of the UE Network Capability of the network access request message sent by a UE having the same IMSI in the past, the NAS security setting process was completed without rejecting the NAS Security Mode setting process (i.e., non-standard terminal). Nevertheless, the fact that the access accept message may be transmitted means that the connection established between the UE and the MME may be abnormally established by a man-in-the-middle attack of the attacker equipment 15. In step S420, the channel established between the UE and the MME may be identified as an abnormal ciphering disablement channel.

Subsequently, step S500 will be described with reference to FIG. 3 again.

In step S500, on the basis of the determination results in steps S200 to S400, appropriate measures may be performed, and a report on the determination and detection results may be generated. In some embodiments, the operations of step S500 may be performed by the control system 200 described with reference to FIG. 2, based on a determination and a detection result provided from the abnormal traffic detection system 100.

The step S500 will be described in more detail with reference to FIG. 7.

Figure 7:
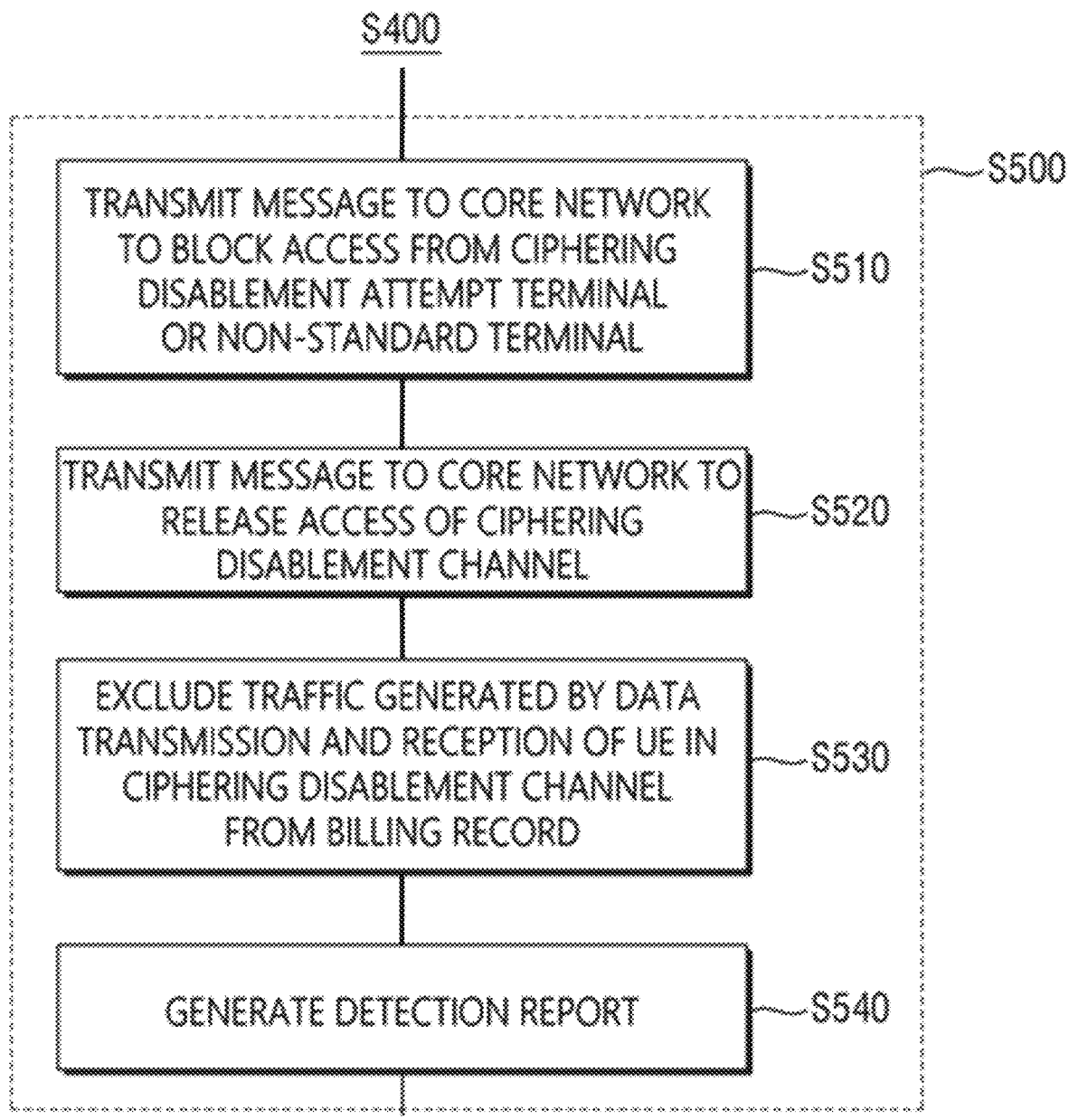
FIG. 7 is a diagram for describing in more detail the steps of taking measures and reporting based on a determination result among steps of the method for detecting abnormal traffic described with reference to FIG. 3.

Referring to FIG. 7, in step S510, a message for limiting access of a ciphering disablement attempt terminal or a non-standard terminal may be transmitted to the core network. For example, the IMSI included in the network access request message from a ciphering disablement attempt terminal or a non-standard terminal may be identified. Further, a message including information indicating that the identified IMSI may be related to a ciphering disablement attempt terminal or a non-standard terminal may be provided to an authentication server such as a HSS (Home Subscriber Server) or AUSF (Authentication server function) of the core network (hereinafter, referred to as "HSS"). The HSS receiving the message may restrictively permit or reject network access based on there being a network access request from a UE having the IMSI in the future.

In embodiments, a notification may be provided, for example by the control system 200, to allow the operator of the network to take appropriate contact, notification, warning, etc. to the owner of the identified IMSI.

In step S520, a message for releasing the access of the ciphering disablement channel may be transmitted to the core network. For example, a message for retrieving the IP address allocated to the UE of the ciphering disablement channel may be transmitted to the gateway to the data network, such as P-GW and UPF of the core network, and the P-GW/UPF may retrieve the IP address.

In step S530, a measure may be taken so that the traffic generated so far due to data transmission/reception by the UE in the ciphering disablement channel may not be charged to the subscriber having the IMSI of the UE. For example, from the billing record associated with the IMSI among the billing records managed by the P-GW/UPF or the billing server, the billing entries corresponding to the traffic generated by the ciphering disablement channel may be excluded. The ciphering disablement channel may be highly likely to be a channel abnormally established by a man-in-the-middle attacker, and a subscriber with the IMSI used for this may be a victim of a man-in-the-middle attack. A network service can be operated so that data traffic generated by a ciphering disablement channel may not be charged to a subscriber who owns the IMSI.

In step S540, detection information on a ciphering disablement attempt terminal, a non-standard terminal, and a ciphering disablement channel may be processed and stored in an appropriate format, and a report to be provided to an operator of the network may be automatically generated.

FIG. 9 is an exemplary diagram illustrating an exemplary format, in which detection information about a ciphering disablement attempt terminal, a non-standard terminal, and a ciphering disablement channel may be collected and processed in some embodiments of the present disclosure. The abnormal traffic detection system 100 described with reference to FIG. 2 may output data collected and processed in the format shown in FIG. 9.

Referring to FIG. 9, detection information may include threat determination information and attacker information. The threat determination information may include the detection time and detection result. The detection result indicates whether there may be a ciphering disablement attempt terminal, a non-standard terminal, or a ciphering disablement channel, and the like, and these may not be mutually exclusive. The attacker information may include MSISDN (e.g., phone number) of the attacker terminal, IMSI information, IP version, IP address, TAI (Tracking Area Identifier) of a base station to which the attacker terminal can access, and the like.

Here, the TAI information of the base station to which the attacker terminal can access may be, based on the attacker terminal transmitting a network access request message to the MME, a TAI (Tracking Area Identifier) set in the base station that transmitted the access accept message. The TAI may be an identifier of an area, to which the base station belongs, and may be information that enables identification of the physical location of the base station. According to an embodiment, the abnormal traffic detection method may identify physical location information of an attacker terminal based on TAI information.

So far, an abnormal traffic detection system and method according to an embodiment of the present disclosure has been described with reference to FIGS. 2 to 9.

Embodiments of the present disclosure can solve a security problem, in which a wireless communication channel, to which ciphering is not applied, may be unintentionally established by a man-in-the-middle attack in the process of NAS security setting between the UE and the core network.

Based on a wireless communication channel, to which ciphering is not applied, being unintentionally established by a man-in-the-middle attack, the attacker can steal the behavior and information of the good UE (call content, network activity, UE location information, etc.), and cause confusion in linked services. An attacker can steal authentication information, identification information, access records, and communication details of good users. In addition to personal communication devices such as smartphones, there may be a risk that an attacker intrudes into the communication of IoT devices that make up a smart home, and controls all terminals (entrance doors, gas valves, other home appliances, etc.) on behalf of normal users. In addition, there may be a possibility that an attacker intrudes into the communication of the connected vehicle, causing a serious threat to the operation of the vehicle and the safety of the occupants.

Embodiments of the present disclosure identify the UE requesting a null ciphering algorithm as a terminal attempting to disable ciphering by collecting and analyzing messages exchanged between the UE and the MME, and identify the UE that has continued the NAS security setting process despite that a setting value different from the past UE Network Capability setting value was delivered to the MME as a non-standard terminal, and nevertheless, based on the NAS security setting being completed between the UE and the MME, the corresponding channel may be identified as a ciphering disablement channel. According to embodiments of the present disclosure, by taking measures such as limiting network access or releasing a currently established channel for a ciphering disablement attempt terminal, a non-standard terminal, and a ciphering disablement channel, the above-described security threats that can be caused by man-in-the-middle attacks in the 4G LTE, 5G NAS and 5G SA network can be solved.

So far, with reference to FIGS. 1 to 9, a method and system for detecting abnormal traffic according to some embodiments of the present disclosure and its application field have been described. Hereinafter, an exemplary computing device 1500 that can implement the abnormal traffic detection system 100 or apparatus, according to some embodiments of the present disclosure will be described with reference to FIG. 10.

Figure 10:
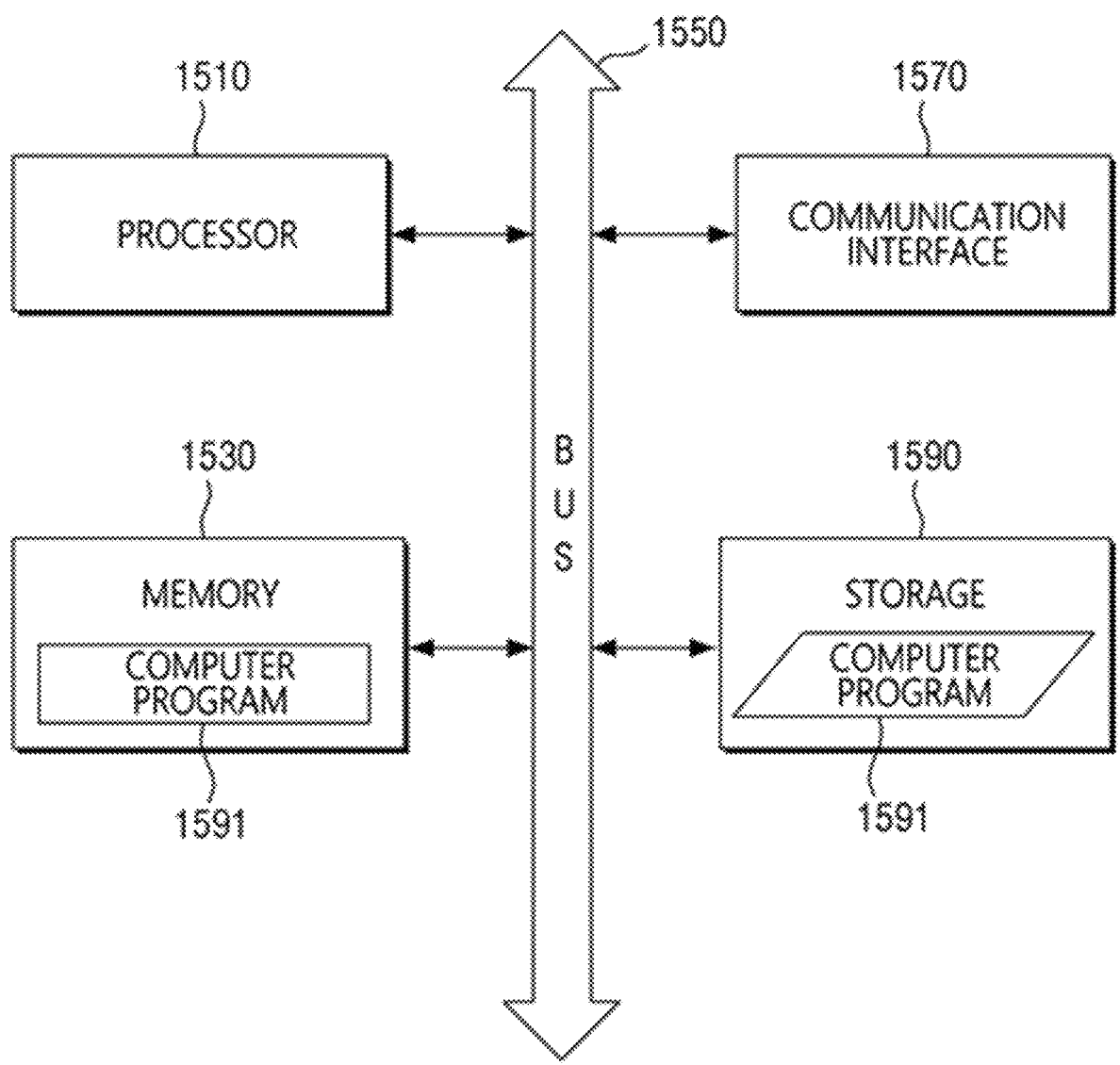
FIG. 10 is a diagram illustrating an exemplary computing device capable of implementing an abnormal traffic detection apparatus according to some embodiments of the present disclosure.

FIG. 10 is an exemplary diagram illustrating an exemplary computing device capable of implementing an abnormal traffic detection apparatus according to some embodiments of the present disclosure.

As shown in FIG. 10, the computing device 1500 may include one or more processors 1510, a bus 1550, a communication interface 1570, a memory 1530, which loads a computer program 1591 executed by the processors 1510, and a storage 1590 for storing the computer program 1591. However, FIG. 10 illustrates the components related to the embodiment of the present disclosure. It will be appreciated by those skilled in the art that the present disclosure may further include other general purpose components in addition to the components shown in FIG. 10.

The processor 1510 may control overall operations of each component of the computing device 1500. The processor 1510 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 1510 may perform calculations on at least one application or program for executing a method/operation according to various embodiments of the present disclosure. The computing device 1500 may have one or more processors.

The memory 1530 may store various data, instructions and/or information. The memory 1530 may load one or more programs 1591 from the storage 1590 to execute methods/operations according to various embodiments of the present disclosure. An example of the memory 1530 may be a RAM, but may not be limited thereto.

The bus 1550 may provide communication between components of the computing device 1500. The bus 1550 may be implemented as various types of bus such as an address bus, a data bus and a control bus.

The communication interface 1570 may support wired and wireless internet communication of the computing device 1500. The communication interface 1570 may support various communication methods other than internet communication. To this end, the communication interface 1570 may be configured to include a communication module based on hardware and/or software well known in the art of the present disclosure.

According to some embodiments, the communication interface 1570 may be omitted.

The storage 1590 can non-temporarily store one or more computer programs 1591. The storage 1590 may be configured to include a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

The computer program 1591 may include one or more instructions, on which the methods/operations according to various embodiments of the present disclosure may be implemented. Based on the computer program 1591 being loaded on the memory 1530, the processor 1510 may perform the methods/operations in accordance with various embodiments of the present disclosure by executing the one or more instructions.

As described above, the abnormal traffic detection apparatus 10 according to some embodiments of the present disclosure may be implemented through the computing device 1500.

So far, various embodiments of the present disclosure and effects according to the embodiments have been mentioned with reference to FIGS. 1 to 10. The effects according to the technical features of the present disclosure may not be limited to the above-mentioned effects, and other effects that may not be mentioned will be clearly understood by those skilled in the art.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, and being used in the other computing device.

In the above description, it may be described that all the components constituting the embodiments of the present disclosure may be combined or operated as one, but the technical features of the present disclosure may not be limited to these embodiments. That is, within the scope of the present disclosure, all of the components may be selectively combined and operated in one or more combinations.

Although the operations may be shown in an order in the drawings, those skilled in the art will appreciate that many variations and modifications can be made to the embodiments without substantially departing from the principles of the present disclosure. The disclosed embodiments of the disclosure may be used in a generic and descriptive sense and not for purposes of limitation. The scope of protection of the present disclosure should be interpreted by the following claims, and all technical ideas within the scope equivalent thereto should be construed as being included in the scope of the technical idea defined by the present disclosure.

What is claimed is:

1. A method for detecting abnormal traffic comprising:
collecting non-access stratum (NAS) traffic between a user equipment (UE) and a mobility management node;
identifying a ciphering algorithm supported by the UE from a network access request message transmitted from the UE to the mobility management node;
identifying the UE as a first type of risk terminal attempting to disable ciphering based on a determination that the UE supports only a null ciphering algorithm among ciphering algorithms;
identifying a subscriber identity information included in the network access request message from the UE;
obtaining a plurality of network access request messages having the identified subscriber identity information;
determining whether 'UE Network Capability' field values included in each of the plurality of network access request messages are identical;
determining whether a 'NAS Security Mode Complete' message has been transmitted from the UE to the mobility management node in response to determining that the 'UE Network Capability' field values in each of the plurality of network access request messages are not identical; and
identifying the UE as a second type of risk terminal at based on a determination that the 'NAS Security Mode Complete' message has been transmitted.

2. The method of claim 1, wherein identifying a ciphering algorithm supported by the UE comprises
identifying a 'UE Network Capability' field value of the network access request message.

3. The method of claim 1 further comprises
transmitting, to a core network, a message to limit access to the UE identified as the first type of risk terminal.

4. The method of claim 3, wherein transmitting a message to limit access to the UE comprises
identifying a subscriber identity information included in the network access request message from the UE; and
transmitting a message including the identified subscriber identity information to an authentication server of the core network.

5. The method of claim 1 further comprises
determining whether an access accept message has been transmitted to the UE from the mobility management node; and
identifying a channel formed between the UE and the mobility management node as a channel at risk based on a determination that the access accept message has been transmitted.

6. The method of claim 5 further comprises
transmitting a message for disconnecting the channel at risk to a core network.

7. The method of claim 6, wherein transmitting a message for disconnecting the channel at risk to a core network comprises
transmitting a message to retrieve an IP address allocated to the UE to a P-GW or user plane function (UPF) of the core network.

8. The method of claim 1 further comprises
transmitting, to a core network, a message to limit access from the UE identified as the second type of terminal at risk.

9. The method of claim 8, wherein transmitting a message to limit access from the UE comprises
transmitting a message including the identified subscriber identity information to an authentication server of the core network.

10. The method of claim 1 further comprises
excluding billing entries corresponding to traffic generated by data transmission and reception of the UE from billing records associated with the identified subscriber identity information based on a determination that the 'UE Network Capability' field values in each of the plurality of network access request messages are not identical.

11. The method of claim 1 further comprises
identifying physical location information of the UE.

12. The method of claim 11, wherein identifying physical location information of the UE comprises
identifying a tracking area identifier (TAI) of a base station that transmitted the network access request message of the UE to the mobility management node.

13. An apparatus for detecting abnormal traffic comprising:
a network interface for collecting non-access stratum (NAS) traffic between a user equipment (UE) and a mobility management node;
a memory for loading a computer program for analyzing collected traffic; and
a processor for executing the loaded computer program,
wherein the computer program comprises
an instruction for identifying a ciphering algorithm supported by the UE from a network access request message transmitted from the UE to the mobility management node;
an instruction for identifying the UE as a first type of risk terminal attempting to disable ciphering based on a determination that the UE supports only a null ciphering algorithm among ciphering algorithms;
an instruction for identifying a subscriber identity information included in the network access request message from the UE;
an instruction for obtaining a plurality of network access request messages having the identified subscriber identity information;
an instruction for determining whether 'UE Network Capability' field values included in each of the plurality of network access request messages are identical;
an instruction for determining whether a 'NAS Security Mode Complete' message has been transmitted from the UE to the mobility management node based on a determination that the 'UE Network Capability' field values in each of the plurality of network access request messages are not identical; and
an instruction for identifying the UE as a second type of risk terminal at based on a determination that the 'NAS Security Mode Complete' message has been transmitted.

14. The apparatus of claim 13, wherein the computer program further comprises
an instruction for determining whether an access accept message has been transmitted to the UE from the mobility management node; and
an instruction for identifying a channel formed between the UE and the mobility management node as a channel at risk based on a determination that the access accept message has been transmitted.

15. A mobile communication system comprising:
a core network including a mobility management node; and
an abnormal traffic detection system
wherein the abnormal traffic detection system is configured to collect traffic between the mobility management node and the UE, identify a ciphering algorithm supported by the UE from a network access request message transmitted from the UE to the mobility management node, identify the UE as a first type of risk terminal attempting to disable ciphering based on a determination that the UE supports only a null ciphering algorithm among ciphering algorithms, determine whether an access accept message has been transmitted to the UE from the mobility management node, identify a channel formed between the UE and the mobility management node as a channel at risk based on a determination that the access accept message has been transmitted, identify a subscriber identity information included in the network access request message from the UE;

obtain a plurality of network access request messages having the identified subscriber identity information;

determine whether 'UE Network Capability' field values included in each of the plurality of network access request messages are identical;

determine whether a 'NAS Security Mode Complete' message has been transmitted from the UE to the mobility management node based on a determination that the 'UE Network Capability' field values in each of the plurality of network access request messages are not identical; and identify the UE as a second type of risk terminal at based on a determination that the 'NAS Security Mode Complete' message has been transmitted.

16. The system of claim 15, wherein the abnormal traffic detection system is further configured to determine whether an access accept message has been transmitted to the UE from the mobility management node; and identify a channel formed between the UE and the mobility management node as a channel at risk based on a determination that the access accept message has been transmitted.

* * * * *